US012785220B2

(12) United States Patent
Lai et al.

(10) Patent No.: US 12,785,220 B2
(45) Date of Patent: Nov. 3, 2026

(54) CURRENT COLLECTOR COMPONENT AND CYLINDRICAL BATTERY

(71) Applicant: JIANGSU ZENERGY BATTERY TECHNOLOGIES GROUP CO., LTD., Jiangsu (CN)

(72) Inventors: Lincong Lai, Jiangsu (CN); Rui Wang, Jiangsu (CN); Hongjiang Yu, Jiangsu (CN); Pan Xu, Jiangsu (CN); Yongjun Li, Jiangsu (CN); Zhigao Luo, Jiangsu (CN)

(73) Assignee: JIANGSU ZENERGY BATTERY TECHNOLOGIES GROUP CO., LTD., Changshu Suzhou (CN)

( * ) Notice: Subject to any disclaimer, the term of this patent is extended or adjusted under 35 U.S.C. 154(b) by 553 days.

(21) Appl. No.: 18/370,592

(22) Filed: Sep. 20, 2023

(65) Prior Publication Data

US 2024/0097285 A1 Mar. 21, 2024

(30) Foreign Application Priority Data

Sep. 20, 2022 (CN) ......................... 202222479073.6

(51) Int. Cl.
*H01M 50/533* (2021.01)
*H01M 50/107* (2021.01)
(Continued)

(52) U.S. Cl.
CPC ....... *H01M 50/533* (2021.01); *H01M 50/107* (2021.01); *H01M 50/152* (2021.01);
(Continued)

(58) Field of Classification Search
CPC ............. H01M 50/533; H01M 50/586; H01M 50/107; H01M 50/559; H01M 50/152;
(Continued)

(56) References Cited

FOREIGN PATENT DOCUMENTS

| | | | | | |
|---|---|---|---|---|---|
| CA | 3205236 | A1 * | 7/2022 | .......... | H01M 50/566 |
| CN | 106688123 | A * | 5/2017 | ........ | H01M 10/0587 |

(Continued)

OTHER PUBLICATIONS

CA_3205236 English Translation (Year: 2022).*
(Continued)

*Primary Examiner* — Jimmy Vo
(74) *Attorney, Agent, or Firm* — The Sun IP Law

(57) ABSTRACT

The disclosure belongs to the technical field of batteries, and particularly relates to a current collector component, which includes a first current collector piece, a second current collector piece, and an insulator, the first current collector piece and the second current collector piece being in insulated connection through an insulator; and the second current collector piece includes a body part, a welding part, and a connecting part, the body part being connected to the insulator and provided with a first electrical connection surface, the connecting part being connected between the body part and the welding part, and the connecting part being bendable, so that the welding part is located on the side, far away from the first electrical connection surface, of the body part. The structure of the disclosure may increase the utilization rate of the internal space of a housing.

18 Claims, 5 Drawing Sheets

(51) Int. Cl.

| | |
|---|---|
| ***H01M 50/152*** | (2021.01) |
| ***H01M 50/184*** | (2021.01) |
| ***H01M 50/188*** | (2021.01) |
| ***H01M 50/536*** | (2021.01) |
| ***H01M 50/559*** | (2021.01) |
| ***H01M 50/566*** | (2021.01) |
| ***H01M 50/586*** | (2021.01) |
| ***H01M 50/593*** | (2021.01) |

(52) U.S. Cl.
CPC ....... *H01M 50/184* (2021.01); *H01M 50/188* (2021.01); *H01M 50/536* (2021.01); *H01M 50/559* (2021.01); *H01M 50/566* (2021.01); *H01M 50/586* (2021.01); *H01M 50/593* (2021.01)

(58) Field of Classification Search
CPC ............. H01M 50/184; H01M 50/188; H01M 50/536; H01M 50/593; H01M 50/566
See application file for complete search history.

(56) References Cited

FOREIGN PATENT DOCUMENTS

| | | | | | |
|---|---|---|---|---|---|
| CN | 113314806 | A | * | 8/2021 | .......... H01M 50/502 |
| CN | 113571847 | A | * | 10/2021 | .......... H01M 50/536 |
| EP | 2660898 | A1 | * | 11/2013 | ............. H01G 11/70 |
| JP | 2007335113 | A | * | 12/2007 | |
| JP | 2021158070 | A | * | 10/2021 | |
| TW | 200308113 | A | * | 12/2003 | .......... H01M 50/466 |

OTHER PUBLICATIONS

CN_106688123 English Translation (Year: 2017).*
CN_113314806 (Year: 2021).*
CN_113571847 (Year: 2021).*
EP_2660898 (Year: 2013).*
JP_2007335113 English Translation (Year: 2007).*
JP_2021158070 English Translation (Year: 2021).*
TW_200308113 English Translation (Year: 2003).*

* cited by examiner

CURRENT COLLECTOR COMPONENT AND CYLINDRICAL BATTERY

TECHNICAL FIELD

The disclosure belongs to the technical field of batteries, and particularly relates to a current collector component and a cylindrical battery.

BACKGROUND

Lithium-ion batteries have the advantages of light weight, high capacity, long life, low self-discharge rate, no memory effect, and no pollution. With the development of modern society, the increasing awareness of environmental protection, and the growing new energy industry, more and more devices choose the lithium-ion batteries as power sources, such as mobile phones, laptop computers, electric tools, and electric vehicles, which provides a broad space for the application and development of the lithium-ion batteries.

Existing large cylindrical batteries usually have tabs at both ends to complete an electrical connection on both sides, resulting in wasted space. At the same time, a current collector component and a cover assembly are connected through penetration welding. However, poor contact in penetration welding will cause manufacturing defects such as faulty soldering, seriously affecting the manufacturing efficiency of the large cylindrical batteries. Therefore, it is urgent to develop a new connection method to improve the manufacturing efficiency of the cylindrical batteries.

SUMMARY

An objective of the disclosure is, in view of the shortcomings of the related art, to provide a current collector component to increase the utilization rate of the internal space of a housing, avoid faulty soldering caused by penetration welding, and effectively improve the manufacturing efficiency.

In order to achieve the above objective, the disclosure adopts the following technical solutions.

A current collector component includes a first current collector piece, a second current collector piece, and an insulator.

The first current collector piece and the second current collector piece are in insulated connection through the insulator.

The second current collector piece includes a body part, a welding part, and a connecting part, the connecting part being arranged between the body part and the welding part, and the connecting part being bendable.

In an embodiment, the body part is parallel to the welding part.

In an embodiment, a connection of the body part and the connecting part is provided with a notch.

In an embodiment, a contact surface of the second current collector piece is fitted with a contact surface of the insulator.

In an embodiment, the first current collector piece includes a main body part, the insulator being provided with a first assembly through hole and a second assembly through hole, the main body part being arranged in the first assembly through hole, and the body part being arranged in the second assembly through hole.

In an embodiment, the insulator is provided with an avoidance area at the second assembly through hole to avoid the connecting part.

In an embodiment, the first current collector piece further includes a boss part integrally formed with the main body part, the insulator being provided with a first avoidance hole at a corresponding position of the boss part.

In an embodiment, the main body part is provided with a plurality of positioning holes, the insulator is provided with clamping parts at corresponding positions of the positioning holes, and the clamping parts are clamped to the positioning holes.

In an embodiment, the main body part and the body part are respectively provided with a plurality of second protrusion parts and third protrusion parts, the second protrusion parts are arranged in the first assembly through hole, and the third protrusion parts are arranged in the second assembly through hole.

In an embodiment, the first assembly through hole and the second assembly through hole are connected through a connection part, and the connection part is provided with a fourth protrusion part.

In an embodiment, the fourth protrusion part is provided with a penetrating hole.

In an embodiment, the edge of the fourth protrusion part is provided with a bayonet.

Another objective of the disclosure is to provide a cylindrical battery, including the above current collector component, a cell, and a cover assembly.

The cell includes a plurality of first tabs connected to a first current collector piece and a plurality of second tabs connected to a body part of a second current collector piece.

A welding part of the second current collector piece is welded to the cover assembly.

In an embodiment, the cover assembly includes a cover, a seal, and an electrode terminal, the cover being provided with a through hole, the electrode terminal passing through the through hole, the electrode terminal being in insulated connection with the cover through the seal, the welding part being welded to the cover, and the boss part extending to the electrode terminal.

In an embodiment, the cylindrical battery further includes a housing, configured to accommodate the cell. The plurality of second protrusion parts and the plurality of third protrusion parts protrude toward the cell.

The plurality of first tabs and the plurality of second tabs are led out from the same side of the cell, and a fourth protrusion part is arranged between the plurality of first tabs and the plurality of second tabs.

In an embodiment, the cover is provided with a fifth recess part on the side facing the cell, and the welding part is embedded into the fifth recess part.

In an embodiment, the electrode terminal is provided with a third recess part on the side facing the cell, and the boss part passes through a first avoidance hole and is embedded into the third recess part.

In an embodiment, the electrode terminal is provided with a fourth recess part on the side far away from the cell.

In an embodiment, the seal is provided with an extension part, and the extension part is arranged between the cover and the first current collector piece.

In an embodiment, the cover is provided with a positioning part on the side facing the cell, the positioning part is convex facing the cell, the positioning part is concave on the side far away from the cell, the extension part is provided with a positioning groove on the side far away from the cell, and the positioning part and the positioning groove are in fit.

In an embodiment, the seal is provided with a plurality of limiting holes, the insulator is provided with limiting parts at corresponding positions of the limiting holes, and the limiting holes and the limiting parts are in fit.

In an embodiment, the cover assembly or the bottom of the housing is provided with an electrolyte injection hole or an explosion-proof valve.

The disclosure has the beneficial effects that the first current collector piece and the second current collector piece are in insulated connection through the insulator to form a whole, so that the space occupation of the current collector component is reduced, and the space utilization rate and energy density of the battery are effectively improved. The second current collector piece includes the body part, the welding part, and the connecting part, the connecting part being arranged between the body part and the welding part, and the connecting part being bendable. Because the second current collector piece is bent, so that when welding the second current collector piece and the cover, a welding head extends into a space between the welding part and the body part, and the welding part and the cover perform laser welding or ultrasonic welding, thereby avoiding faulty soldering caused by penetration welding of the second current collector piece and the cover, and greatly improving the manufacturing efficiency of the cylindrical battery.

BRIEF DESCRIPTION OF THE DRAWINGS

The features, advantages, and technical effects of exemplary implementations of the disclosure will be described below with reference to the accompanying drawings.

Illustration of the following reference signs:

1. Cell; 11. First tab; 12. Second tab;

2. Housing;

3. Cover assembly; 31. Cover; 310. Through hole; 311. Fifth recess part; 312. Sixth recess part; 313. Positioning part;

32. Seal; 321. Positioning groove; 322. Limiting hole; 323. Extension part;

33. Electrode terminal; 331. Third recess part; 332. Fourth recess part;

4. Current collector component; 41. First current collector piece; 411. Main body part; 412. Boss part; 413. Second protrusion part; 414. Positioning hole;

42. Second current collector piece; 421. Body part; 422. Welding part; 423. Connecting part; 424. Notch; 425. First protrusion part; 426. Third protrusion part;

43. Insulator; 431. First recess part; 432. First avoidance hole; 433. Connection part; 4331. First assembly through hole; 4332. Second assembly through hole; 4333. Avoidance area; 434. Fourth protrusion part; 435. Penetrating hole; 436. Bayonet; 437. Limiting part; 438. Clamping part.

DETAILED DESCRIPTION OF THE EMBODIMENTS

Certain terms are used, for example, in the description and claims to refer to particular components. Those skilled in the art should understand that a hardware manufacturer may use different terms to refer to the same component. The specification and claims do not use the difference in name as a way to distinguish components, but use the difference in function of components as a criterion for distinguishing. As mentioned throughout the specification and claims, "comprising" is an open term, so it should be interpreted as "including but not limited to". "Approximately" means that within an acceptable error range, those skilled in the art can solve technical problems within a certain error range and basically achieve technical effects.

In addition, terms "first" and "second" are only used for describing purposes, and cannot be understood as indicating or implying relative importance.

In the disclosure, unless otherwise clearly specified and limited, the terms "installation", "mutual connection", "connection", "fixation" and other terms shall be understood in a broad sense. For example, the term is a fixed connection or a detachable connection, or an integrated connection; the term is a mechanical connection or an electric connection; and the term is a direct connection or an indirect connection through an intermediary, and is communication inside two components. Those of ordinary skill in the art may understand the specific meanings of the terms in the disclosure according to specific conditions.

The disclosure is further described in detail below in combination with the accompanying drawings, but is not limited thereto.

Figure 1:
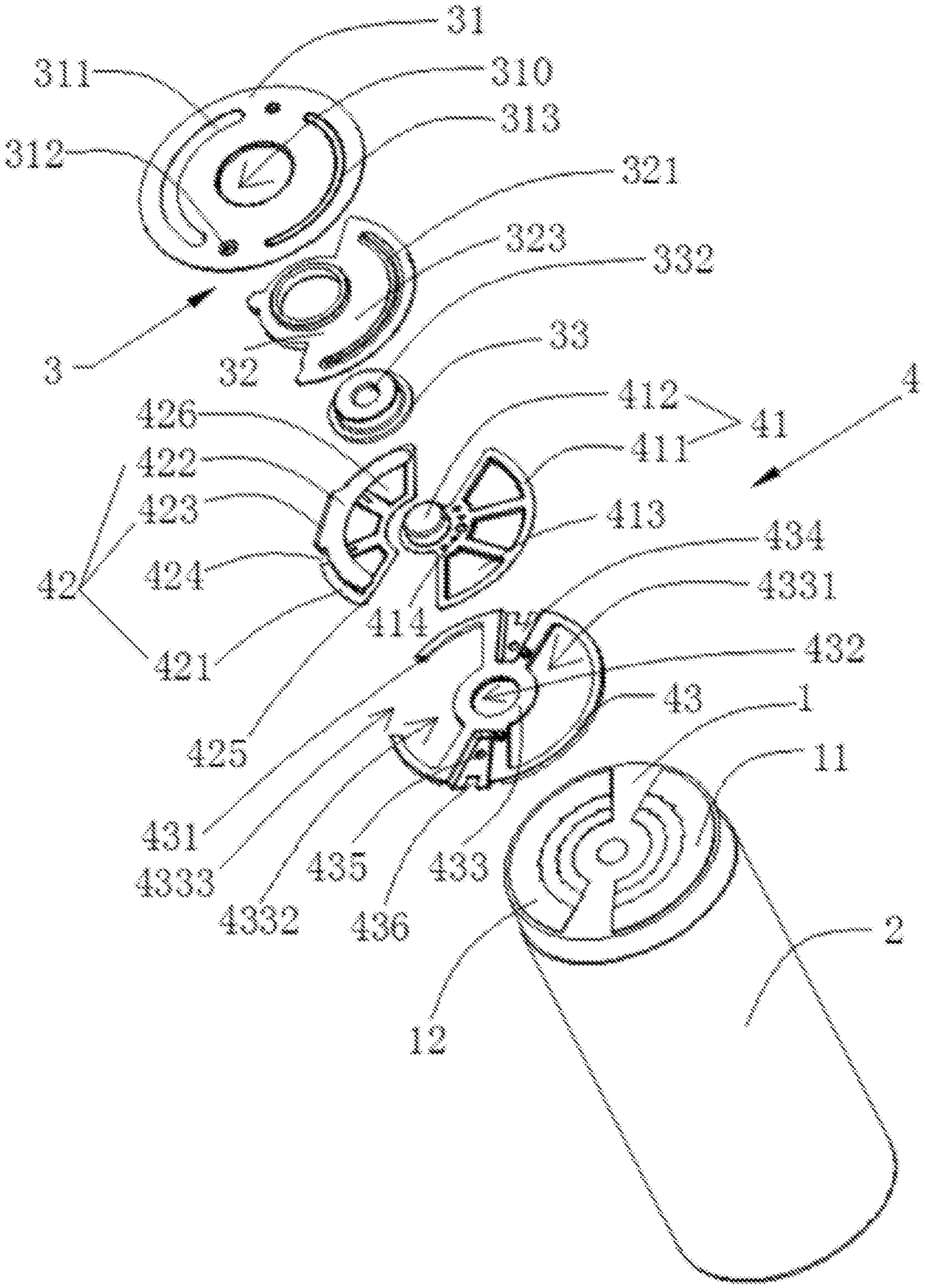
FIG. 1 is a schematic structural diagram of a cylindrical battery according to an embodiment of the disclosure.
Figure 2:
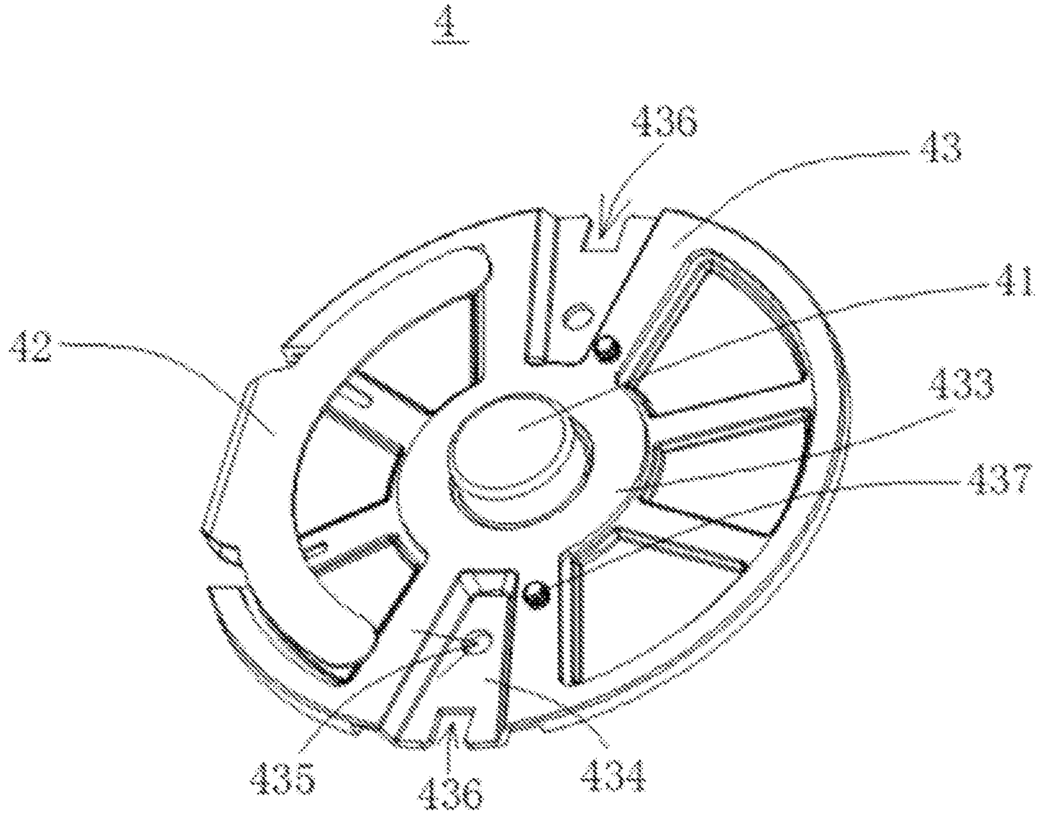
FIG. 2 is a first schematic structural diagram of a current collector component according to an embodiment of the disclosure.
Figure 3:
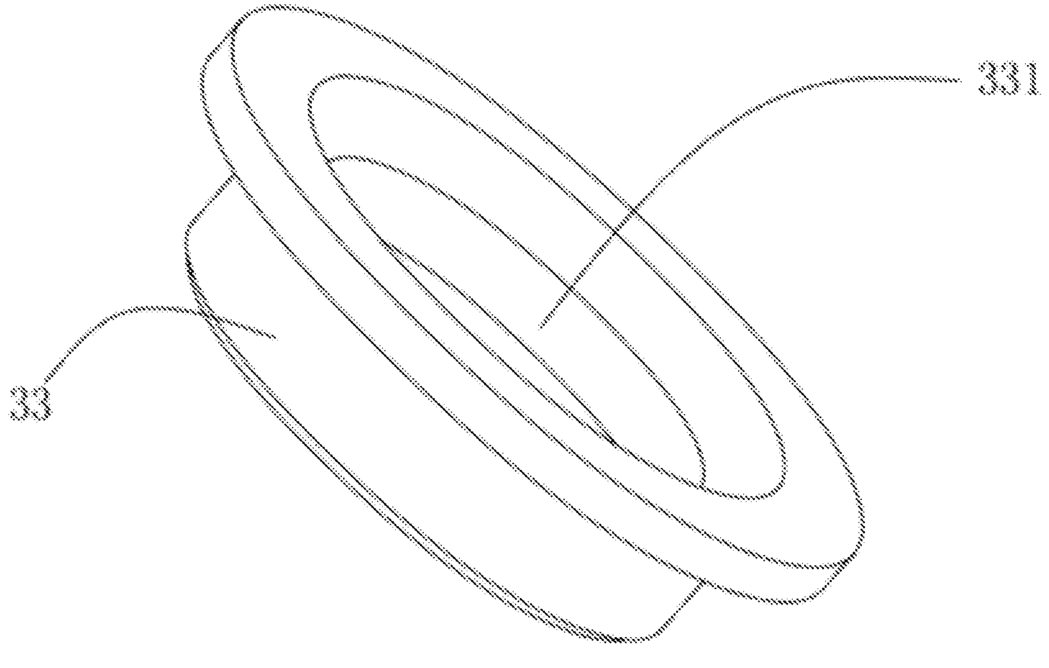
FIG. 3 is a schematic structural diagram of an electrode terminal according to an embodiment of the disclosure.
Figure 4:
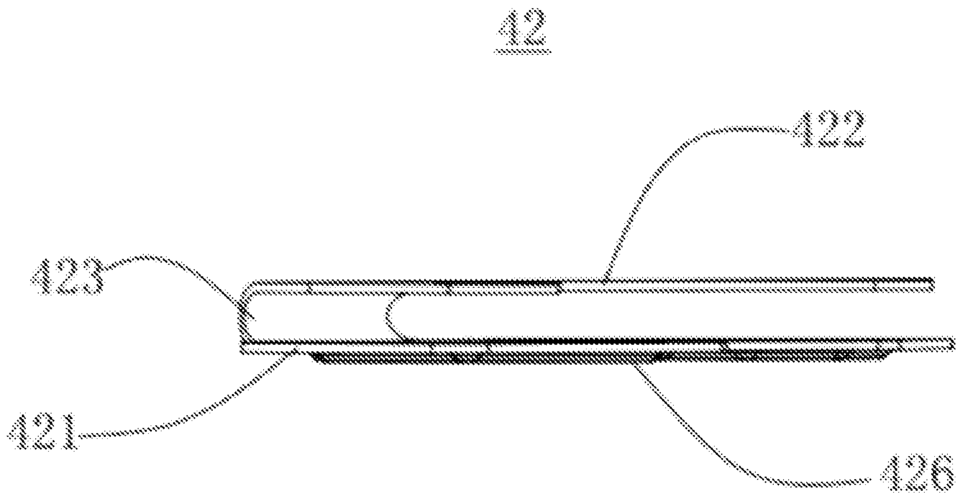
FIG. 4 is a front view of a second current collector piece according to an embodiment of the disclosure.
Figure 5:
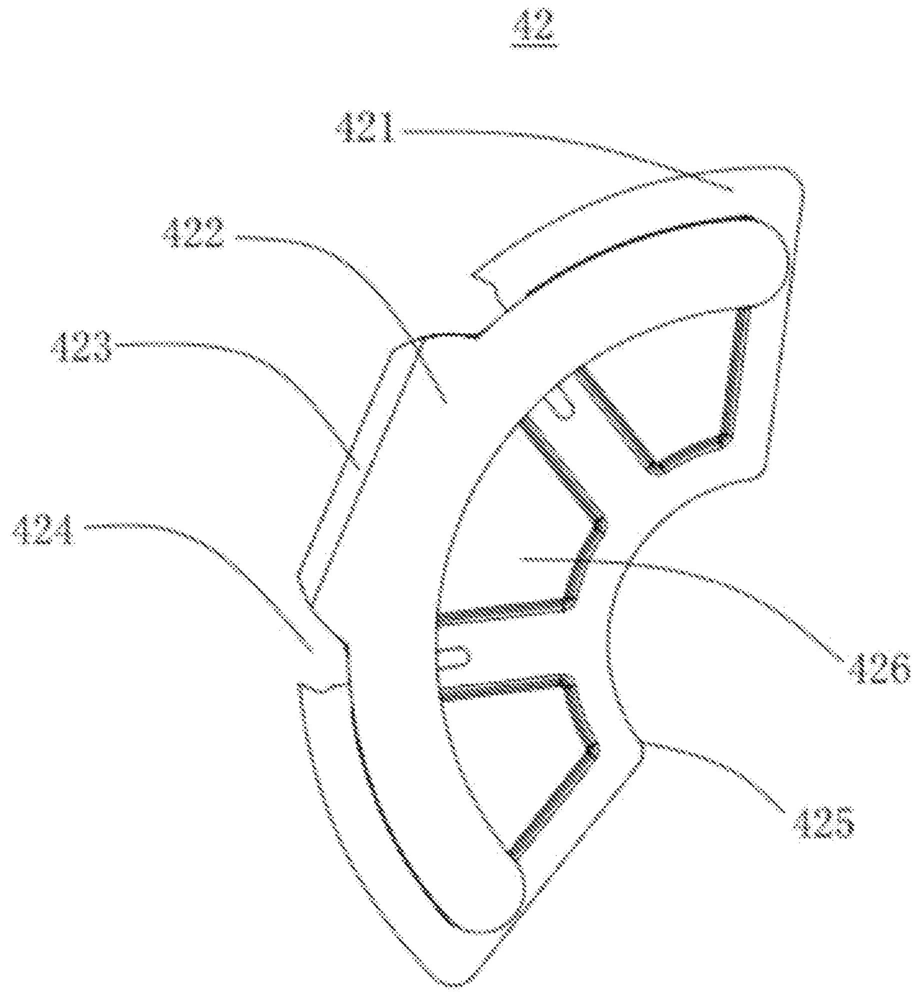
FIG. 5 is a top view of a second current collector piece according to an embodiment of the disclosure.
Figure 6:
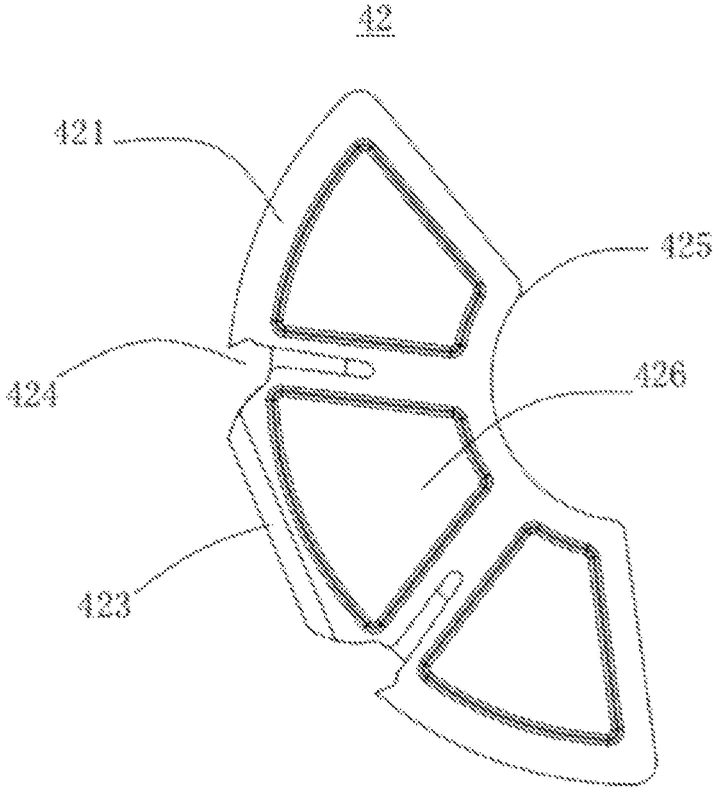
FIG. 6 is a bottom view of a second current collector piece according to an embodiment of the disclosure.
Figure 7:
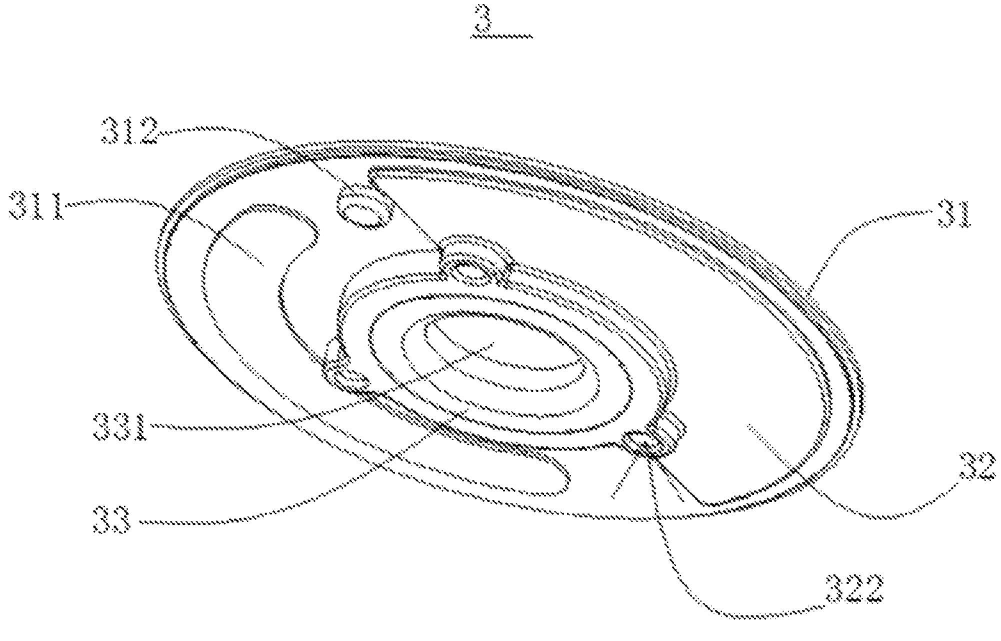
FIG. 7 is a schematic structural diagram of a cover assembly according to an embodiment of the disclosure.
Figure 8:
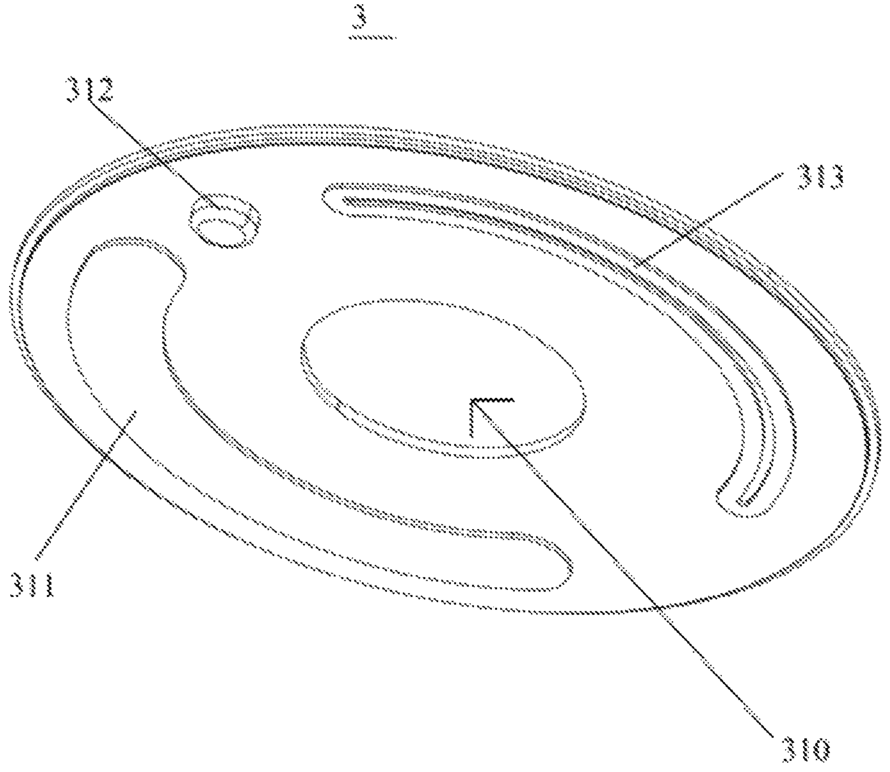
FIG. 8 is a schematic structural diagram of a cover according to an embodiment of the disclosure.
Figure 9:
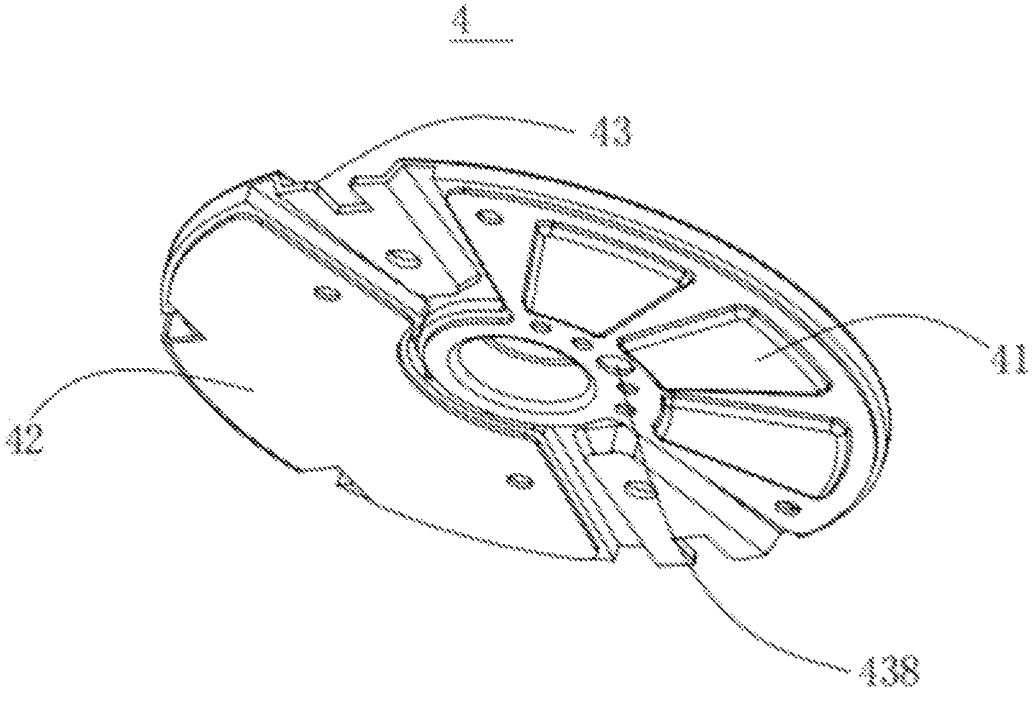
FIG. 9 is a second schematic structural diagram of a current collector component according to an embodiment of the disclosure.

As shown in FIG. 1 to FIG. 9, embodiments of the disclosure disclose a current collector component, which includes a first current collector piece 41, a second current collector piece 42, and an insulator 43.

The first current collector piece 41 and the second current collector piece 42 are in insulated connection through the insulator 43.

The second current collector piece 42 includes a body part 421, a welding part 422, and a connecting part 423, the connecting part 423 being arranged between the body part 421 and the welding part 422, and the connecting part 423 being bendable.

In some embodiments, the body part 421 is provided with a notch 424, there are two notches 424, the two notch 424 are located on both sides of the connecting part 423, and the notches 424 are arranged at a connection of the body part 421 and the connecting part 423.

In the above embodiment, the body part 421 is provided with the two notches 424, and the two notches 424 are arranged on both sides of the connecting part 423, so that bending of the connecting part 423 is facilitated. At the same time, because the body part 421, the welding part 422, and the connecting part 423 are integrally formed, the body part 421 may deform when the connecting part 423 is bent, and the notches 424 are arranged on both sides of the connection of the connecting part 423 and the body part 421 to prevent the deformation of the body part 421 when the connecting part 423 is bent, thereby ensuring the shape and structure of a body part 421.

In some embodiments, a contact surface of the second current collector piece 42 and the insulator 43 is provided with a first protrusion part 425, and the insulator 43 is provided with a first recess part 431 matched with the first protrusion part 425 at a corresponding position.

In the above embodiment, the insulator 43 is provided with the first recess part 431, and the second current collector piece 42 is provided with the first protrusion part 425, so that the first recess part 431 and the first protrusion part 425 are in fit, thereby enhancing the connection strength between the second current collector piece 42 and the insulator 43, and also facilitating the alignment and connection of the second current collector piece 42 and the insulator 43.

In an embodiment, surface treatment is performed on the contact surface of the insulator 43 and the second current collector piece 42, so that the contact surface of the insulator 43 and the second current collector piece 42 is rough, so as to improve the surface energy of the insulator 43 and the second current collector piece 42, and further enhance the connection strength between the insulator 43 and the second current collector piece 42.

Similarly, a contact surface of the first current collector piece 41 and the insulator 43 is provided with the first recess part 431, and the insulator 43 is provided with the first protrusion part 425 matched with the first recess part 431 at the corresponding position. Or, the contact surface of the first current collector piece 41 and the insulator 43 is provided with the first protrusion part 425, and the insulator 43 is provided with the first recess part 431 matched with the first protrusion part 425 at the corresponding position. Through the fit of the first protrusion part 425 and the first recess part 431, the connection strength between the first current collector piece 41 and the insulator 43 is enhanced. In an embodiment, surface treatment is performed on the contact surface of the insulator 43 and the first current collector piece 41, so that the contact surface of the insulator 43 and the first current collector piece 41 is rough, so as to improve the surface energy of the insulator 43 and the first current collector piece 41, and further enhance the connection strength between the insulator 43 and the first current collector piece 41.

In some embodiments, the first current collector piece 41 includes a main body part 411, the insulator 43 being provided with a first assembly through hole 4331 and a second assembly through hole 4332, the main body part 411 is arranged in the first assembly through hole 4331, and the body part 421 is arranged in the second assembly through hole 4332. The first assembly through hole 4331 and the second assembly through hole 4332 are arranged, so that the main body part 411 and the body part 421 pass through the insulator 43 to be respectively electrically connected to a cover 31 and an electrode terminal 33.

In some embodiments, the insulator 43 is provided with an avoidance area 4333 at the second assembly through hole 4332 to avoid the connecting part 423. Furthermore, the avoidance area 4333 is arranged, so that the connecting part 423 is electrically connected to the cover 31.

In some embodiments, the first current collector piece 41 further includes a boss part 412 integrally formed with the main body part 411, the insulator 43 being provided with a first avoidance hole 432 at a corresponding position of the boss part 412.

In the above embodiments, the first current collector piece 41 is provided with the boss part 412, so that the first current collector piece 41 and the electrode terminal 33 are in contact and welded. At the same time, the main body part 411 and a plurality of first tabs 11 are in contact and welded, so that the plurality of first tabs 11 of a cell 1 is electrically connected to the electrode terminal 33 through the first current collector piece 41. Because the boss part 412 needs to be in contact with the electrode terminal 33, the insulator 43 is provided with the first avoidance hole 432 at the corresponding position, so that the boss part 412 passes through the first avoidance hole 432, thereby completing the contact between the boss part 412 and the electrode terminal 33.

In some embodiments, the main body part 411 is provided with a plurality of positioning holes 414, the insulator 43 is provided with clamping parts 438 at corresponding positions of the positioning holes 414, and the clamping parts 438 are clamped to the positioning holes 414.

The main body part 411 is provided with the plurality of positioning holes 414, and the insulator 43 is provided with the clamping parts 438 at the corresponding positions of the positioning holes 414, so that the clamping parts 438 are clamped to the positioning holes 414, thereby ensuring that the positions of the first current collector piece 41 and the insulator 43 are fixed during a nano-injection molding process of the insulator 43. At the same time, the connection strength between the first current collector piece 41 and the insulator 43 is enhanced to ensure that the positions of the first current collector piece 41 and the insulator 43 are fixed.

In some embodiments, the main body part 411 and the body part 421 are respectively provided with a plurality of second protrusion parts 413 and third protrusion parts 426, the second protrusion parts 413 are arranged in the first assembly through hole 4331, and the third protrusion parts 426 are arranged in the second assembly through hole 4332. The first assembly through hole 4331 and the second assembly through hole 4332 are second avoidance holes.

In the above embodiment, the main body part 411 and the body part 421 are respectively provided with the plurality of second protrusion parts 413 and third protrusion parts 426 extending to the cell 1. The main body part 411 performs laser penetration welding on the second protrusion parts 413 to enable the first current collector piece 41 to be electrically connected to the plurality of first tabs 11, thereby preventing the faulty soldering phenomenon caused by the welding of the plurality of first tabs 11 and the main body part 411. The body part 421 performs laser penetration welding on the third protrusion parts 426 to enable the second current collector piece 42 to be electrically connected to the plurality of second tabs 12, thereby preventing the faulty soldering phenomenon caused by the welding of the plurality of second tabs 12 and the body part 421. Due to the need for laser penetration welding, the insulator 43 is provided with the second avoidance hole, so that the second protrusion parts 413 and the third protrusion parts 426 are exposed for welding. Because the second protrusion parts 413 is exposed through the second avoidance hole, in order to prevent the contact between the second protrusion parts 413 and the cover 31, the shape of a seal 32 needs to cover the second protrusion parts 413, thereby isolating the second protrusion parts 413 from the cover 31.

In some embodiments, the first assembly through hole 4331 and the second assembly through hole 4332 are connected through a connection part 433, and the connection part 433 is provided with fourth protrusion parts 434.

In the above embodiment, because a cylindrical battery shakes during use, in order to ensure that the positions of the current collector component 4 and the cell 1 remain relatively stationary, the insulator 43 is provided with the fourth protrusion parts 434 extending toward the cell 1 between the first assembly through hole 4331 and the second assembly through hole 4332. Because the fourth protrusion parts 434 play a good limiting role, relative displacement of the cell 1 and the current collector component 4 in a vertical direction is prevented, and at the same time avoiding relying on the welding structure and playing a fixing role, thereby ensuring the welding quality and prolonging the service life. Two fourth protrusion parts 434 are symmetrically arranged about the first avoidance hole 432.

In some embodiments, the insulator 43 is provided with a penetrating hole 435 in the fourth protrusion part 434.

The insulator 43 is provided with the penetrating hole 435 in the fourth protrusion parts 434, so that when injecting an electrolyte into the cylindrical battery, the penetrating hole 435 provides a channel for allowing the electrolyte to enter the cell 1, thereby speeding up the infiltration rate of the cell and improving the injection efficiency.

In some embodiments, the edge of the fourth protrusion part 434 is provided with a bayonet 436.

When the current collector component 4 is assembled on the cell 1, the bayonet 436 provided by the fourth protrusion part 434 is configured for positioning, so that the first current collector piece 41 is aligned with the plurality of first tabs 11, and the second current collector piece 42 is aligned with the plurality of second tabs 12, and facilitating clamping and positioning of the current collector component 4.

A cylindrical battery includes a cell 1, a housing 2, a cover assembly 3, and a current collector component 4.

A plurality of first tabs 11 and a plurality of second tabs 12 are led out from the same side of the cell 1.

The housing 2 is configured to accommodate the cell 1.

The cover assembly 3 includes a cover 31, a seal 32, and an electrode terminal 33, the cover 31 being provided with a through hole 310, the electrode terminal 33 passing through the through hole 310, and the electrode terminal 33 being in insulated connection with the cover 31 through the seal 32.

The current collector component 4 includes a first current collector piece 41, a second current collector piece 42, and an insulator 43. The first current collector piece 41 and the second current collector piece 42 are in insulated connection through an insulator 43. The first current collector piece 41 is configured to electrically connect the electrode terminal 33 to the plurality of first tabs 11. The second current collector piece 42 includes a body part 421, a welding part 422 and a connecting part 423, three of the body part 421, the welding part 422 and a connecting part 423 are formed by bending. The body part 421 is parallel to the welding part 422, the connecting part 423 is arranged between the body part 421 and the welding part 422, the body part 421 is electrically connected to the plurality of second tabs 12, and the welding part 422 is electrically connected to the cover 31.

The cell 1 is a component for an electrochemical reaction in the battery. The plurality of first tabs 11 and the plurality of second tabs 12 are led out from the cell 1, and the plurality of first tabs 11 and the plurality of second tabs 12 protrude from the end of the cell 1. Of course, in the disclosure, the plurality of first tabs 11 and the plurality of second tabs 12 are located at the same end of the cell 1. The cell 1 may include a positive electrode plate, a negative electrode plate, and a separator. The cell 1 is of a winding structure formed by winding the positive electrode plate, the separator, and the negative electrode plate. The cell 1 is of a laminated structure formed by a laminated arrangement of the positive electrode plate, the separator, and the negative electrode plate. After the cell 1 is wound to the winding structure having positive and negative electrodes led out from the same end, the plurality of first tabs 11 and the plurality of second tabs 12 are flattened or kneaded to increase the contact area of the plurality of first tabs 11, the plurality of second tabs 12 and the external electrical connection, so as to increase the current passing area.

The positive electrode plate includes a positive current collector and a positive active material layer coated on two opposite sides of the positive current collector. The negative electrode plate includes a negative current collector and a negative active material layer coated on two opposite sides of the negative current collector. The cell 2 is a part corresponding to an area, coated with the active material layer, of the electrode plate, the positive tab is a part, not coated with the positive active material layer, of the positive electrode plate, and the negative tab is a part, not coated with the negative active material layer, of the negative electrode plate. Taking a lithium-ion battery as an example, the material of the positive current collector is aluminum, and a positive active material is lithium cobaltate, lithium iron phosphate, ternary lithium or lithium manganate, etc. The material of the negative current collector is copper, and the negative active material is carbon, or silicon, etc. In order to ensure that no fusing occurs through a large current, the number of positive tabs is multiple, and the number of negative tabs is multiple. One of the first tabs and the second tabs is the positive tabs and the other is the negative tabs. The material of the separator is polypropylene (PP) or polyethylene (PE).

The housing 2 is a component configured to accommodate the cell 1, the housing 2 is of a hollow structure with an opening formed at one end, and the housing 2 is of a hollow structure with openings formed at both ends. The housing 2 is made of a variety of materials, such as copper, iron, aluminum, steel, aluminum alloy, etc. The shape of the housing 2 is a cylinder. When the housing 2 is of the hollow structure with the openings formed at both ends, one of the openings is welded and sealed by a metal sheet and the other is welded and sealed by the cover assembly 3. At the same time, in order to enhance the connection strength and speed up the welding efficiency, a step structure is arranged in the opening of the housing 2.

The cover assembly 3 is a component that covers the opening of the housing 2 to isolate the internal environment of the battery from the external environment. The cover assembly 3 covers the opening of the housing 2, and the cover assembly 3 and the housing 2 together define a sealed space configured to accommodate the cell 1, the electrolyte, and other components. The cover assembly 3 includes the cover 31, the seal 32, and the electrode terminal 33, and the projection shape of the cover 31 is adapted to the projection shape of the housing 2, for example, the housing 2 is of a cylindrical structure, and the cover 31 is a round plat-like structure adapted to the housing 2. The cover 31 is made of a variety of materials, such as copper, iron, aluminum, steel, aluminum alloy, etc. The cover 31 is provided with the through hole 310, the electrode terminal 33 passes through the through hole 310, and the electrode terminal 33 is fixed to the cover 31 in an insulating manner through the seal 32. The electrode terminal 33 is made of a conductive metal material, such as aluminum, etc., and the seal 32 is made of an insulating material, such as rubber, etc. Surface treatment, such as chemical corrosion and laser engraving, is performed on the contact surface of the cover 31 and the seal 32 and the contact surface of the electrode terminal 33 and the seal 32, so as to form multiple nano-pores in the contact surfaces. The seal 32 is injection molded between the cover 31 and the electrode terminal 33.

The current collector component 4 is arranged between the cell 1 and the cover assembly 3, and the current collector component 4 includes the first current collector piece 41, the second current collector piece 42, and the insulator 43. The first current collector piece 41 and the second current collector piece 42 are in insulated connection through an insulator 43. The first current collector piece 41 is configured to electrically connect the electrode terminal 33 to the plurality of first tabs 11. The second current collector piece 42 includes the body part 421, the welding part 422 and the connecting part 423, three of the body part 421, the welding part 422 and the connecting part 423 are formed by bending. The body part 421 is parallel to the welding part 422, the connecting part 423 is arranged between the body part 421 and the welding part 422, the body part 421 is electrically connected to the plurality of second tabs 12, and the welding part 422 is electrically connected to the cover 31. It is to be noted that the area of the welding part 422 is appropriately increased, so as to increase the current passing area and improve the current passing capacity of the second current collector piece 42. No limits are made to the shape of the welding part 422. Surface treatment, such as chemical corrosion and laser engraving, is performed on the contact surface of the first current collector piece 41 and the insulator 43 and the contact surface of the second current collector piece 42 and the insulator 43, so as to form multiple nano-pores in the contact surfaces. The insulator 43 is injection molded between the first current collector piece 41 and the second current collector piece 42.

In the embodiment, the plurality of first tabs 11 and the plurality of second tabs 12 are led out from the cell 1 at the same end, the first current collector piece 41 and the second current collector piece 42 are in insulated connection through the insulator 43 to form a whole, and the electrode terminal 33 and the cover 31 are in insulated connection through the seal 32, so that the first current collector piece 41 electrically connects the plurality of first tabs 11 to the electrode terminal 1, and the second current collector piece 42 electrically connects the plurality of second tabs 12 to the cover 31. Because the first current collector piece 11 and the second current collector piece 12 are led out from the same end, and the first current collector piece 11 and the second current collector piece 12 are located on the same end, the space occupation of the current collector pieces and the tabs is reduced, and the space utilization rate and energy density of the battery are effectively improved. At the same time, the second current collector piece 42 is arranged to bent forming the body part 421, the welding part 422 and the connecting part 423, so that the plurality of second tabs 12 and the cover 31 are welded by the second current collector piece 42 to achieve an electrical connection. Because the second current collector piece 42 in the embodiment is bent, when welding the second current collector piece 42 and the cover 31, a welding head extends into a space between the welding part 422 and the body part 421, so that the welding part 422 and the cover 31 perform laser welding or ultrasonic welding, thereby avoiding faulty soldering caused by penetration welding of the second current collector piece 42 and the cover 31, and greatly improving the manufacturing efficiency of the cylindrical battery.

In some embodiments, the cover 31 is provided with a fifth recess part 311 on the side facing the cell 1, the shape of the fifth recess part 311 is matched with that of the welding part 422, and the welding part 422 is embedded into the fifth recess part 311.

In the above embodiment, the cover 31 is provided with the fifth recess part 311 on the side facing the cell 1, at the same time, the shape of the fifth recess part 311 is matched with that of the welding part 422, so that the welding part 422 is embedded into the fifth recess part 311, thereby preventing the welding part 422 from moving during welding, and avoiding falling-off of a welding mark caused by the welding part 422 due to the shaking of the cylindrical battery. At the same time, because the welding part 422 is embedded into the fifth recess part 311, the occupation of the internal space of the cylindrical battery by the second current collector piece 42 is reduced, thereby improving the space utilization rate of the cylindrical battery and the energy density of the battery. Exemplarily, the shape of the welding part 422 of the second current collector piece 42 is an arc-shaped strip, so that the fifth recess part 311 is arranged to be an arc-shaped strip, so that the welding part 422 is completely adapted to the fifth recess part 311 to prevent the welding part 422 from moving.

In some embodiments, the cover 31 is provided with a sixth recess part 312, and the sixth recess part 312 fixes the cover 31 during the injection molding process of the insulator 43 to avoid the shaking of the cover 31.

In some embodiments, the electrode terminal 33 is provided with a third recess part 331 on the side facing the cell 1, and the boss part 412 passes through the first avoidance hole 432 and is embedded into the third recess part 331.

In the above embodiment, the electrode terminal 33 and the first current collector piece 41 are welded by laser welding, ultrasonic torque welding, resistance welding or laser penetration welding, and the electrode terminal 33 is provided with the third recess part 331 on the side facing the cell 1, so that the boss part 412 of the first current collector piece 41 is embedded into the third recess part 331, which facilitates the alignment and connection between the electrode terminal 33 and the first current collector piece 41, and increases the contact area of the electrode terminal 33 and the first current collector piece 41, thereby improving the current passing capacity.

In some embodiments, the electrode terminal 33 is provided with a fourth recess part 332 on the side far away from the cell 1.

The electrode terminal 33 is provided with the fourth recess part 332 on the side far away from the cell 1, so that the thickness of the side of the electrode terminal 33 for penetration welding is reduced, thereby reducing the energy of the laser passing through the electrode terminal 33, reducing the energy output, and improving the welding efficiency.

In some embodiments, the seal 32 is provided with an extension part 323, and the extension part 323 is arranged between the cover 31 and the first current collector piece 41. The extension part 323 ensures that the seal 32, after the cover assembly 3 covers the housing 2, isolates the first current collector piece 41 from the cover 31 to avoid a short circuit caused by direct contact between the first current collector piece 41 and the cover 31.

In some embodiments, the cover 31 is provided with a positioning part 313 on the side facing the cell 1, the positioning part 313 is convex facing the cell 1, the positioning part is concave on the side far away from the cell 1, the extension part 323 is provided with a positioning groove 321 on the side far away from the cell 1, and the positioning part 313 and the positioning groove 321 are in fit.

In the above embodiment, because the positioning part 313 is convex facing the cell 1, the positions of the seal 32 and the cover 31 are fixed through the fit of the positioning part 313 and the positioning groove 321, which avoids the seal 32 from rotating to fail to isolate the cover 31 from the first current collector piece 41. At the same time, the positioning part 313 is concave on the side far away from the cell 1, so that the stress generated by welding on the cover 31 is reduced. It is understandable that the positioning part 313 is obtained by stamping the cover 31.

In some embodiments, the seal 32 is provided with a plurality of limiting holes 322, the insulator 43 is provided with limiting parts 437 at corresponding positions of the limiting holes 322, and the limiting holes 322 and the limiting parts 437 are in fit.

Through the fit of the limiting holes 322 and the limiting parts 437, the seal 32 is well aligned with the insulator 43, at the same time, it is ensured that the seal 32, after the cover assembly 3 covers the housing 2, isolates the first current collector piece 41 from the cover 31 to avoid a short circuit caused by direct contact between the first current collector piece 41 and the cover 31.

In some embodiments, the cover assembly 3 or the bottom of the housing 2 is provided with an electrolyte injection hole or an explosion-proof valve.

The cover assembly 3 or the bottom of the housing 2 is provided with the electrolyte injection hole, so that the electrolyte is injected into the cylindrical battery through the electrolyte injection hole, and after the electrolyte injection is completed, the electrolyte injection hole is sealed using a metal sheet. The cover assembly 3 or the bottom of the housing 2 is provided with the explosion-proof valve, so that when the cylindrical battery has thermal runaway, the internal gas is discharged through the explosion-proof valve in time, so as to complete the pressure relief, thereby ensuring the use safety of the cylindrical battery.

According to the disclosure and teaching of the above specification, those skilled in the art to which the disclosure pertains can also change and modify the above implementations. Therefore, the disclosure is not limited to the above specific implementations, and any obvious improvement, substitution or modification made by those skilled in the art on the basis of the disclosure shall fall within the scope of protection of the disclosure. In addition, although some specific terms are used in the specification, these terms are only for convenience of description and do not constitute any limitation to the disclosure.

What is claimed is:

1. A current collector component, comprising:

a first current collector piece, a second current collector piece, and an insulator, the first current collector piece and the second current collector piece being in insulated connection through an insulator; and the second current collector piece comprises a body part, a welding part, and a connecting part, the connecting part being arranged between the body part and the welding part, and the connecting part being bendable, the first current collector piece comprises a main body part, the insulator being provided with a first assembly through hole and a second assembly through hole. the main body part being arranged in the first assembly through hole, and the body part being arranged in the second assembly through hole, the first current collector piece further comprises a boss part integrally formed with the main body part, the insulator being provided with a first avoidance hole at a corresponding position of the boss part.

2. The current collector component according to claim 1, wherein the body part is parallel to the welding part; and/or a connection of the body part and the connecting part is provided with a notch; and/or a contact surface of the second current collector piece is fitted with a contact surface of the insulator.

3. The current collector component according to claim 1, wherein the insulator is provided with an avoidance area at the second assembly through hole to avoid the connecting part.

4. The current collector component according to claim 3, wherein the main body part is provided with a plurality of positioning holes, the insulator is provided with clamping parts at corresponding positions of the positioning holes, and the clamping parts are clamped to the positioning holes.

5. The current collector component according to claim 3, wherein the main body part and the body part are respectively provided with a plurality of second protrusion parts and third protrusion parts, the second protrusion parts are arranged in the first assembly through hole, and the third protrusion parts are arranged in the second assembly through hole.

6. The current collector component according to claim 3, wherein the first assembly through hole and the second assembly through hole are connected through a connection part, and the connection part is provided with a fourth protrusion part.

7. The current collector component according to claim 6, wherein the fourth protrusion part is provided with a penetrating hole.

8. The current collector component according to claim 6, wherein the edge of the fourth protrusion part is provided with a bayonet.

9. A cylindrical battery, comprising the current collector component according to claim 1, a cell, comprising a plurality of first tabs connected to the first current collector piece and a plurality of second tabs connected to a body part of the second current collector piece; and a cover assembly, a welding part of the second current collector piece being welded to the cover assembly.

10. The cylindrical battery according to claim 9, wherein the cover assembly comprises a cover, a seal, and an electrode terminal, the cover being provided with a through hole, the electrode terminal passing through the through hole, the electrode terminal being in insulated connection with the cover through the seal, the welding part being welded to the cover, the first current collector piece being provided with a boss part, and the boss part extending to the electrode terminal.

11. The cylindrical battery according to claim 9, further comprising: a housing, configured to accommodate the cell, the first current collector piece being provided with a plurality of second protrusion parts, the second current collector piece being provided with a plurality of third protrusion parts, and the plurality of second protrusion parts and the plurality of third protrusion parts protruding toward the cell;

the plurality of first tabs and the plurality of second tabs are led out from the same side of the cell; and the insulator is provided with a fourth protrusion part, and the fourth protrusion part is arranged between the plurality of first tabs and the plurality of second tabs.

12. The cylindrical battery according to claim 10, wherein the cover is provided with a fifth recess part on the side facing the cell, and the welding part is embedded into the fifth recess part.

13. The cylindrical battery according to claim 10, wherein the electrode terminal is provided with a third recess part on the side facing the cell, the insulator is provided with a first avoidance hole at a corresponding position of the boss part, and the boss part passes through the first avoidance hole and is embedded into the third recess part.

14. The cylindrical battery according to claim 10, wherein the electrode terminal is provided with a fourth recess part on the side far away from the cell.

15. The cylindrical battery according to claim 10, wherein the seal is provided with an extension part, and the extension part is arranged between the cover and the first current collector piece.

16. The cylindrical battery according to claim 15, wherein the cover is provided with a positioning part on the side facing the cell, the positioning part is convex facing the cell, the positioning part is concave on the side far away from the cell, the extension part is provided with a positioning groove on the side far away from the cell, and the positioning part and the positioning groove are in fit.

17. The cylindrical battery according to claim 10, wherein the seal is provided with a plurality of limiting holes, the insulator is provided with limiting parts at corresponding positions of the limiting holes, and the limiting holes and the limiting parts are in fit.

18. The cylindrical battery according to claim 11, wherein the cover assembly or the bottom of the housing is provided with an electrolyte injection hole or an explosion-proof valve.

* * * * *